US007883070B2

(12) United States Patent
Schroeder et al.

(10) Patent No.: US 7,883,070 B2
(45) Date of Patent: Feb. 8, 2011

(54) SECURE POST

(76) Inventors: Jeffrey Scott Schroeder, 10417 256th Ave., Trevor, WI (US) 53179; David Arthur Heyden, 205 Foxford Dr., Cary, IL (US) 60013

( * ) Notice: Subject to any disclaimer, the term of this patent is extended or adjusted under 35 U.S.C. 154(b) by 0 days.

(21) Appl. No.: 11/725,198

(22) Filed: Mar. 19, 2007

(65) Prior Publication Data

US 2008/0230674 A1 Sep. 25, 2008

(51) Int. Cl.
*F16M 13/00* (2006.01)

(52) U.S. Cl. ........................ 248/545; 248/530; 248/156

(58) Field of Classification Search ................. 248/545, 248/530, 165
See application file for complete search history.

(56) References Cited

U.S. PATENT DOCUMENTS 5,065,975 A * 11/1991 Giles .......................... 248/545
5,106,252 A * 4/1992 Shapton ...................... 411/539
2008/0017226 A1* 1/2008 Nobert et al. ................. 135/16

* cited by examiner

*Primary Examiner*—J. Allen Shriver, II
*Assistant Examiner*—Erin Smith

(57) ABSTRACT

A device installed at the base of a vertical post used to stabilize the post in an upright vertical plumb condition and prevent the post from leaning. The device is comprised of a flat base (1) manufactured in two halves so that when placed together has a geometric shape opening (3) of the same size of the post the device is to be installed around. The device base contains multiple secondary penetrations (2) of the cross-sectional shape of the anchoring stakes (9) to be used. The device is installed at the post base (8) by placing the two halves around the post and joining together at along a common line (5). The two halves are affixed together using a mending plate (7) and screws (6) or other type methods not shown. The anchoring stakes (9) are then inserted through the secondary penetrations (2) to affix the device to the ground.

3 Claims, 6 Drawing Sheets

EXPLODED VIEW
(NOT TO SCALE)

FIG. 1
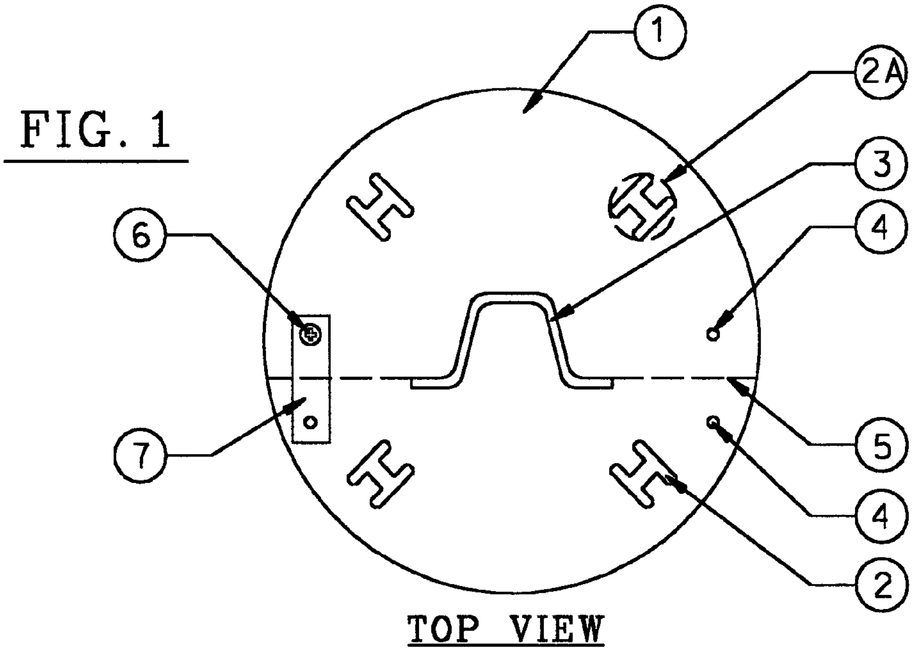
TOP VIEW
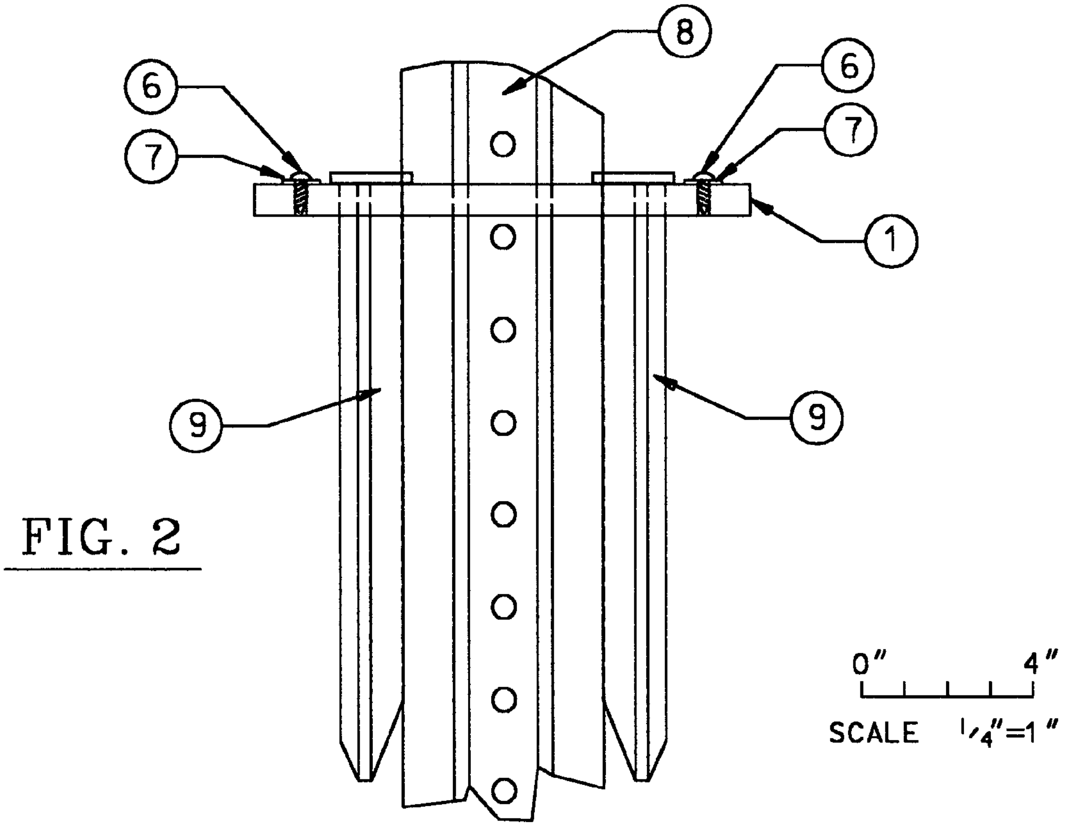
FIG. 2
ELEVATION VIEW

EXPLODED VIEW
(NOT TO SCALE)

NON-WEED BARRIER (FIG. 4)
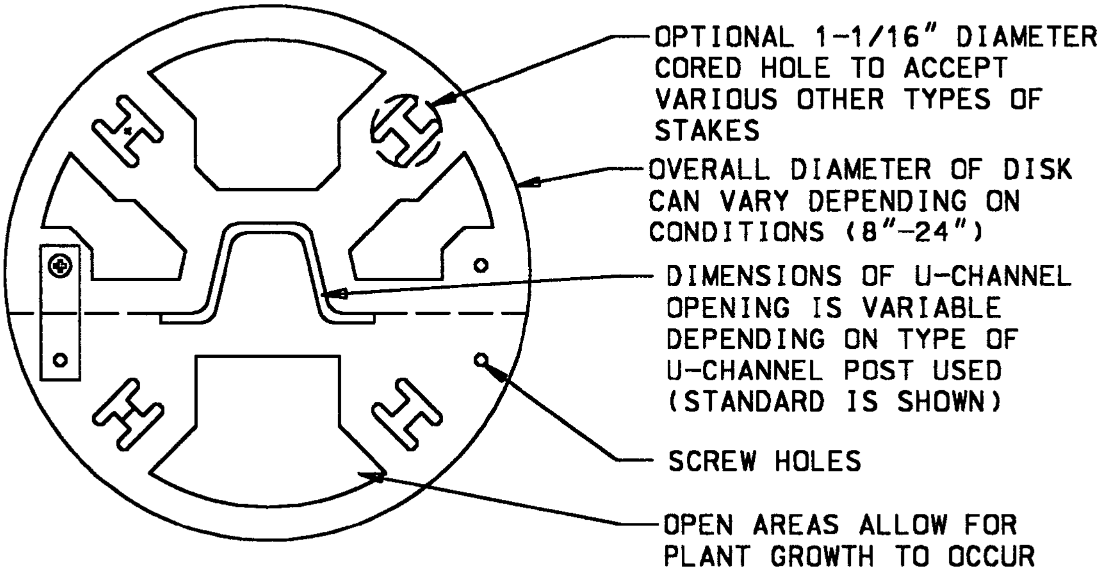
TOP VIEW
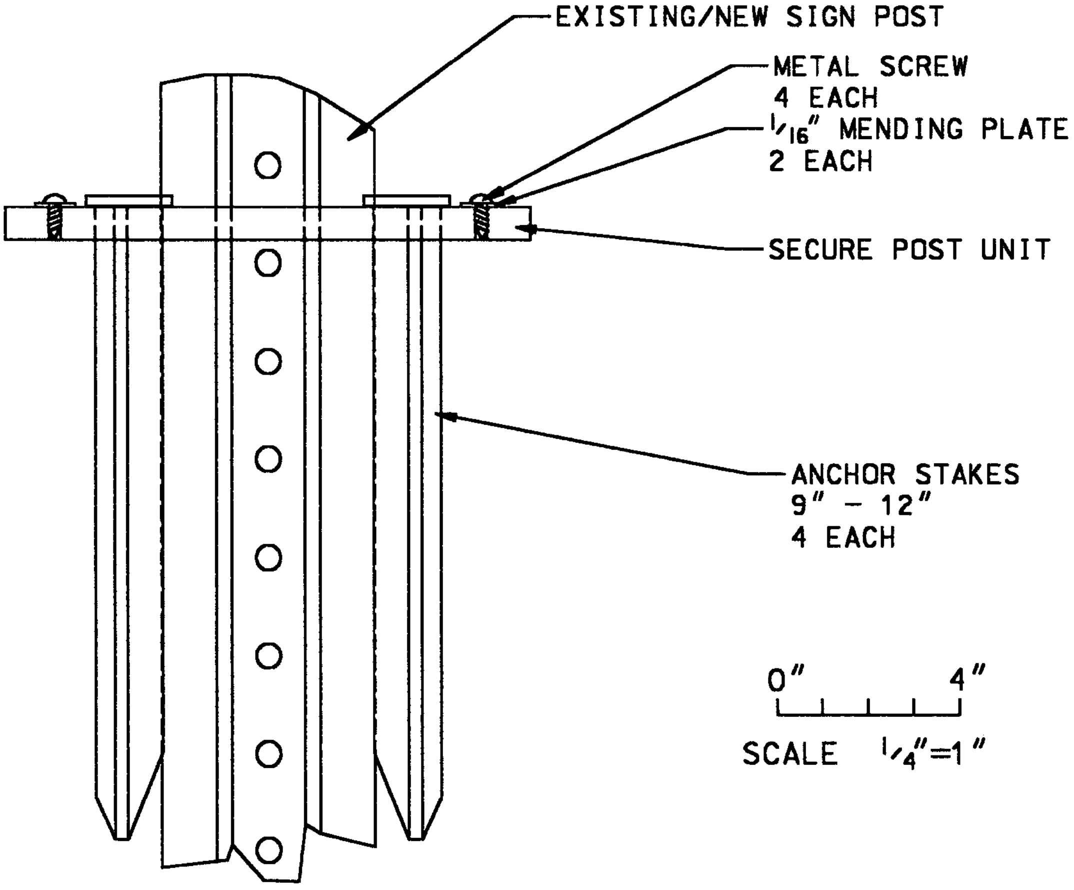
ELEVATION VIEW

STEEL POST - WEED BARRIER
(FIG. 5)
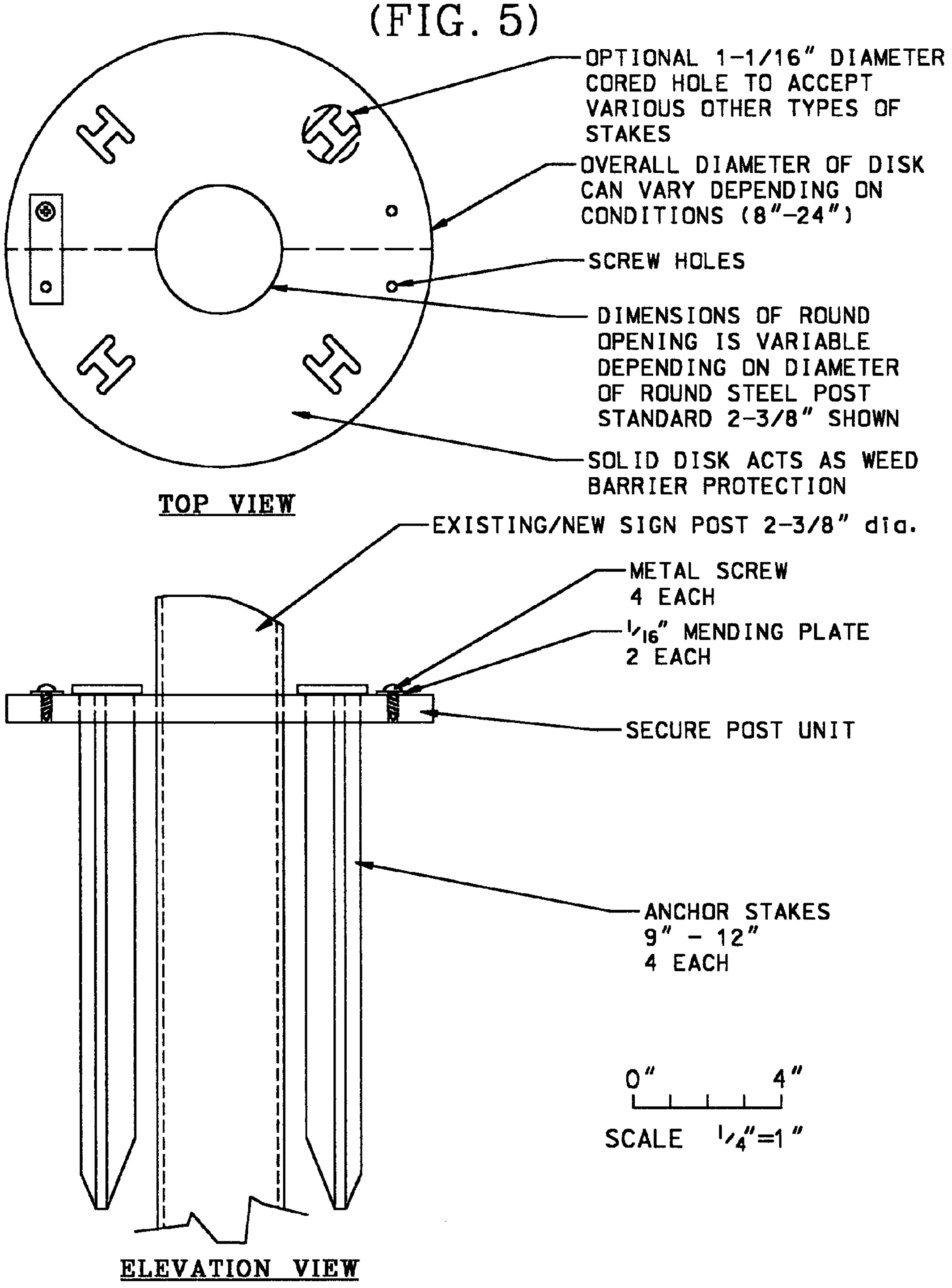

STEEL POST - WEED BARRIER
(FIG. 6)
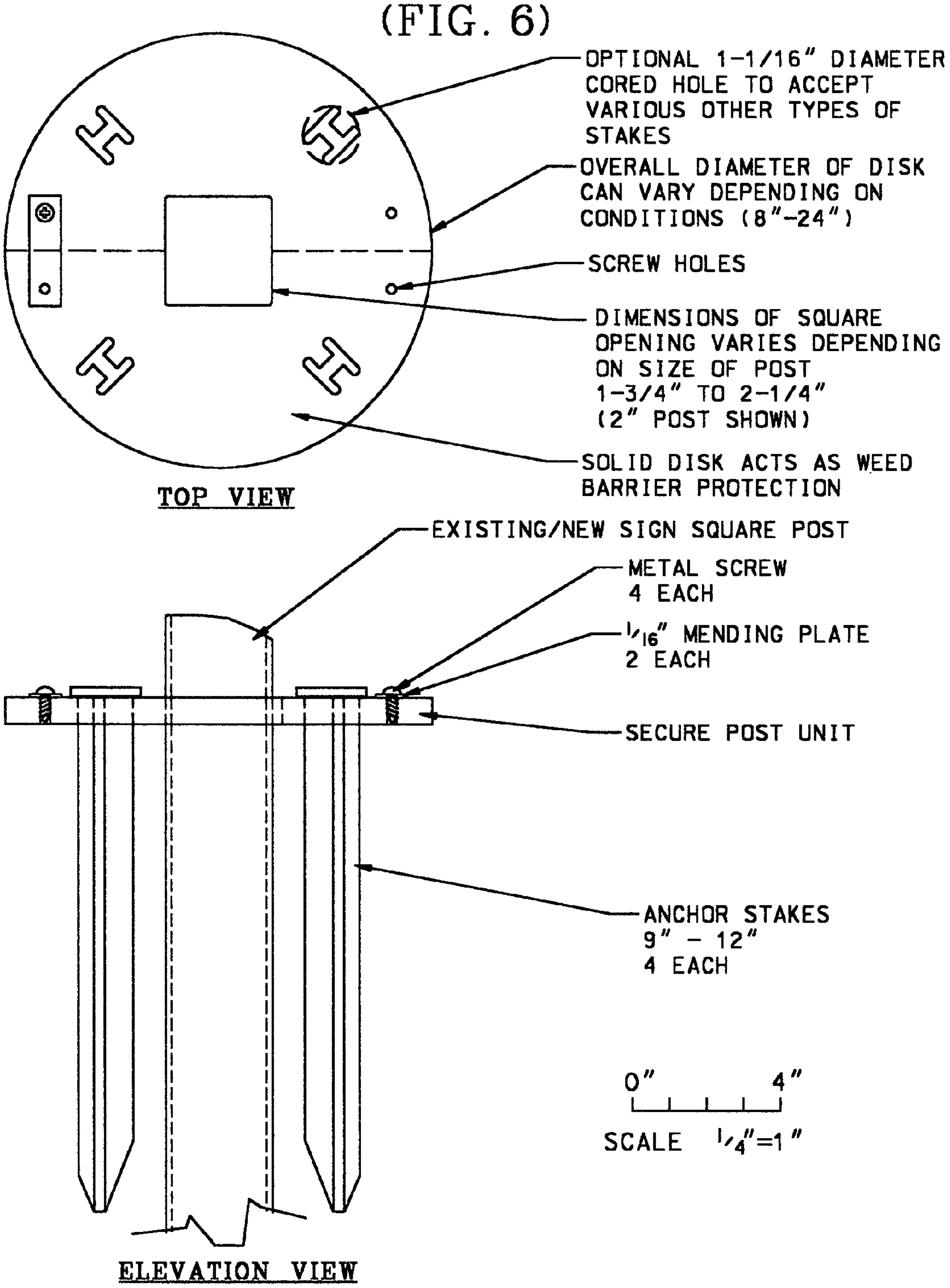

WEED BARRIER (FIG. 7)
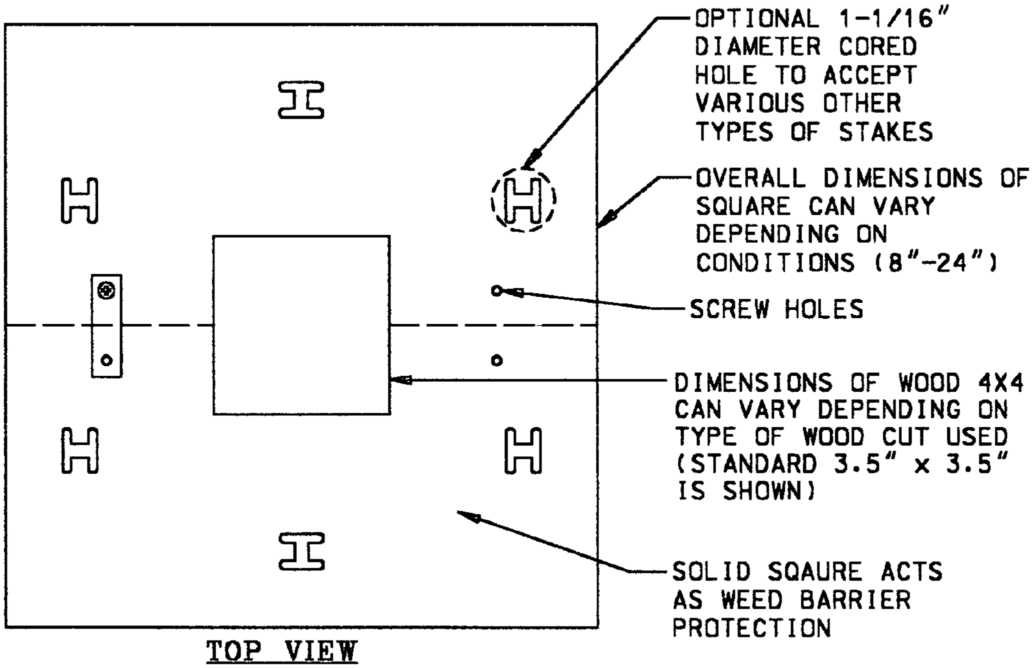
TOP VIEW
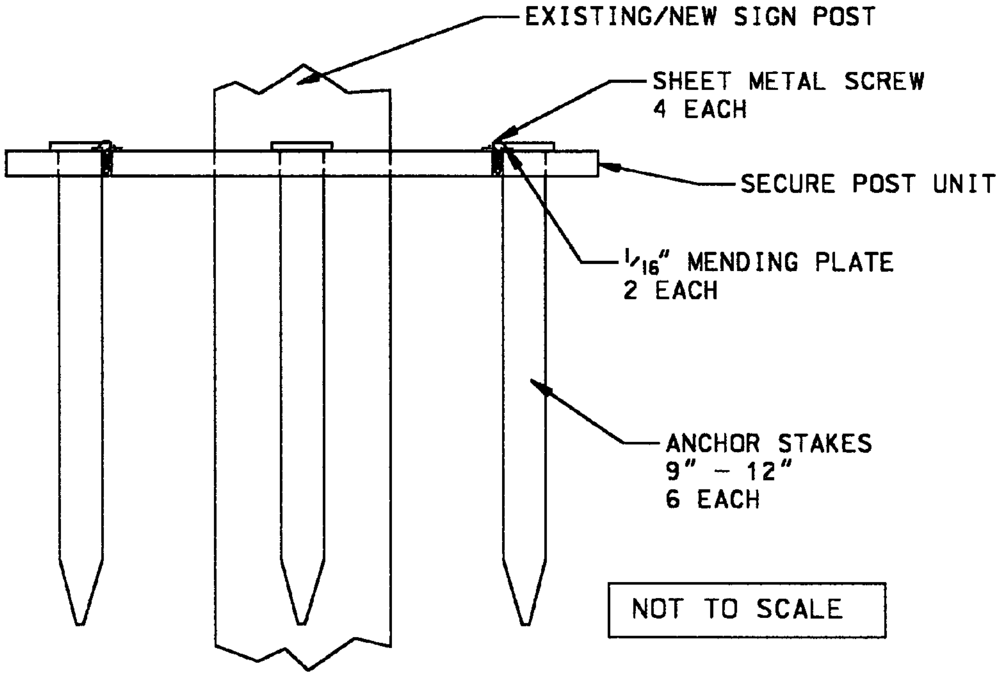
ELEVATION VIEW

SECURE POST

CROSS-REFERENCE TO RELATED APPLICATIONS

Not applicable

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISK APPENDIX

Not applicable

BACKGROUND OF THE INVENTION

This invention relates to the straightening repair of metal and wood street signage and mailbox posts. Street sign post often become loose and begin to lean after being exposed to frequent wind forces. It is also common for mailbox posts to become loose and begin to lean due to the frequent pulling and shutting of the box as well as being subject to snow impacts during snow plow removal operations in the colder climates. The Secure Post device provides an easy, low cost way to keep these posts in a plumb or vertical position once an existing post has been repositioned. The device can also be used in new installations for added support in poor soils and to prevent the posts from future leaning concerns.

BACKGROUND

Description of Prior Art

In the United States roadway street signs and their posts are required to be installed in a straight and plumb condition by the Manual of Uniform Traffic Control Devices. This common practice is used throughout the world. A sign that is not in a straight and plumb condition can de determined unlawful and not enforceable. In accordance with the above, all street signs are initially installed in a plumb and vertical position. Over time, some signs begin to lean due to the ground condition, forces of wind and other natural phenomena. Currently, it is common practice to restore a leaning sign to a vertical position by either wedging material into the ground by the base of the sign post, encasing the base in concrete or to remove and replace the sign post entirely.

These current methods are less than optimal. The wedging of a stone or block of wood at the base of the sign can often fix the problem temporarily but as this does not address the cause of the failure, the sign often begins to lean again after a fairly short period of time. Another method is to excavate and pour concrete at the base of the post. This is usually an effective permanent solution but involves a lot of time and effort to complete and if the sign is inadvertently struck by a vehicle, the removal and reinstallation process is more difficult. The third common method is to remove and replace the post with a new post or same post driven in a slightly different location. This can be a complicated process as the existing sign needs to be removed from the post and reinstalled, underground utilities must be located, and typically is labor intensive.

The same leaning concern can be found in the case of residential mailboxes that are commonly supported by similar means. After a length of time, mailbox posts will typically lean out toward the road due to the daily pulling open and shutting force exerted prior to inserting or removing mail. Additionally, in colder climates where snow removal operations are common, the force of snow hitting the mailbox and post will cause the mailbox to lean in the direction of the plowed snow. While there are no specific requirements for a mailbox to be straight, leaning mailboxes are not aesthetically pleasing to the eye. While not requiring mailboxes to be vertical or plumb, local postal codes often require the mailbox to be a certain distance away from the curb or edge of traveled way and usually at a specified height. A leaning mailbox can result in non-compliance with the codes.

Recently, the street sign field has seen the introduction of various items designed to reduce the cost associated with sign replacement by using breakaway bases and other types of sleeves if a sign is struck but nothing to address the ability to remain in a vertical position. Additionally, in the case of residential mailboxes, items are available to sink into the ground and act as a base for support during the initial installations. But these are only different options of installation and do not address the corrective action of a leaning mailbox without removing and replacing the existing support.

Most street maintenance forces in charge of keeping signs in a straight, legal and aesthetically pleasing condition, therefore, desire a low cost simple solution to correct this common problem.

The most common use for the Secure Post device will be to assist in the securement of a post in an upright vertical position after the post has been restored to a vertical position from a leaning position. In layman terms: fix a leaning post, or ensure that a newly installed post will retain a vertical position.

The distinct difference and the advantage of this device over works of prior art and similar patented devices is that the Secure Post device is capable of being installed around an existing post. Removal of the existing post is not required. All other similar works of prior art cannot be installed without removal of the existing post. The most similar works of prior art provide an alternate means of anchoring a post or post assembly into a ground surface and therefore require the removal and replacement of the post. The Secure Post device requires the embedment of a post through the device and into the ground below. As such, the device can be used in conjunction with similar prior works of art such as Callies (Patent No.: U.S. Pat. No. 7,152,841 B2). The center penetration of Secure Post could be enlarged to match the cross-sectional area of the Callies support post device and installed around such device to provide additional stability of the post and Callies device.

While the Giles as modified apparatus (Patent No.: U.S. Pat. No. 5,065,975) does provide for a lower support plate and associated projectile members that may be directed with an underlying support surface, such as the ground, the post itself does not extend past the base and into the ground. The Giles as modified apparatus is a single piece mounted directly on the surface by anchoring stakes and has a threaded center to accept a new threaded post that is then used to support upper plate and mailbox. This is part of an entire post assembly that is used in lieu of an existing mailbox post and is specific to mailbox posts. The Giles as modified claim clearly states the field of invention relates to mail box support arrangements, and more particularly pertains to a new and improved mail box support apparatus. The Giles as modified apparatus utilizes the support base and associated anchoring spikes as it means of providing the structural support.

Alternatively, the Secure Post device has been developed to be installed around an existing post previously embedded into the ground and has a broad range of post applications which includes not only posts for mailboxes but many other uses of posts such as a fence post, a street sign post, clothesline post, etc. The advantage of Secure Post is that the center penetration can be modified in production to account for varying cross-sectional areas of posts such as found in the varying type and cross-sectional size of street signs posts. The most common types of street sign posts are the two-inch diameter steel post, two-inch by two-inch square post and u-channel post. The Secure Post device utilizes the embedment of the post for support and the Secure Post device is installed to provide the additional stability of the post to secure the post in an upright and vertical position. No removal of the post is necessary.

And while the Johnson (U.S. Pat. No. 5,689,918) invention provides for additional stability of a sign posts, the Johnson invention also requires installation of the device on a sign post prior to installing the sign post or retrofitting an existing post by removing and reinstalling the sign post. The Johnson invention also clearly indicates the use of vertical plane wing members for stabilization and is described as an anchor. Alternatively the Secure Post device utilizes a horizontal plane to improve stability through providing additional horizontal surface area which is then anchored to the ground using stakes.

With respect to the above descriptions, it is to be realized that the dimensions as shown in the illustration figures can have varied dimensions with regards to size, shape, thickness, of the overall device. The methods to connect the two sections can vary depending on the intended use and the desired stability required for the device to operate as a single section after joining.

BRIEF SUMMARY OF THE INVENTION

Accordingly, we claim the following as our objects and advantages of the invention: a device installed at the base of a sign post to secure a post in a vertical position either during the initial installation of the sign or mailbox post or after being returned to a vertical position from a leaning position.

The device works on a simple principal. A sign or mailbox post enters the ground in a single isolated location. The object that is being supported on a post is often much larger than the size of the post. When forces exert energy on the object being supported by the post, the energy is transferred to the base of the sign post at the ground. The Secure Post device enlarges the area for this energy to be dissipated at the ground, thereby reducing the effect of these forces at the base of the post.

As the size of signs and soil conditions vary, the size of the Secure Post device is designed to vary as well. Smaller signs installed in better ground conditions will use a smaller Secure Post device while larger signs and poorer soil conditions will take larger devices. The Secure Post device can also be manufactured to fit the many varieties of sign or mailbox post types from round to square to u-channel and the different sizes of each. This device could be used for other post or pole supported features as well such as cloth line poles, fence posts and sport game net support poles such as used for badminton nets.

Another benefit of the device is that this device can be manufactured as a solid piece, except for the openings necessary for the posts and stakes, which can resist the growth of weeds and grass around the base of a sign or as a semi-solid disk which allows for the growth of material around the base. The device can be mounted above or below the ground depending on the desired aesthetic appearance at the base.

The stakes used to anchor the device to the ground can range from a common plastic tent stake to a metal cork-screw type stake. The type of stake used will depend on the ground condition and loading.

BRIEF DESCRIPTION OF THE INVENTION

The attached figures are shown to further explain the device and its adaptability to varying conditions:

FIG. 1 shows the device in a top view. The device shown in this figure is for a circular shaped device for a u-channel type post with each individual part assigned a reference number.

FIG. 2 shows the device in a side view. This view shows the anchor stakes installed with the mending plates and screws used to join the two halves of the device together. All parts shown are assigned a reference number.

FIG. 4 shows the typical top and elevation view of the semi-solid device for a standard u-channel type sign post.

FIG. 5 shows the typical top and elevation view of the solid device for a standard steel round type sign post.

FIG. 6 shows the typical top and elevation view of the standard steel square type sign post.

FIG. 7 shows the typical top and elevation view of the standard 4×4 wood post or mailbox post type device.

DRAWING REFERENCE NUMBERS

Figure 3:
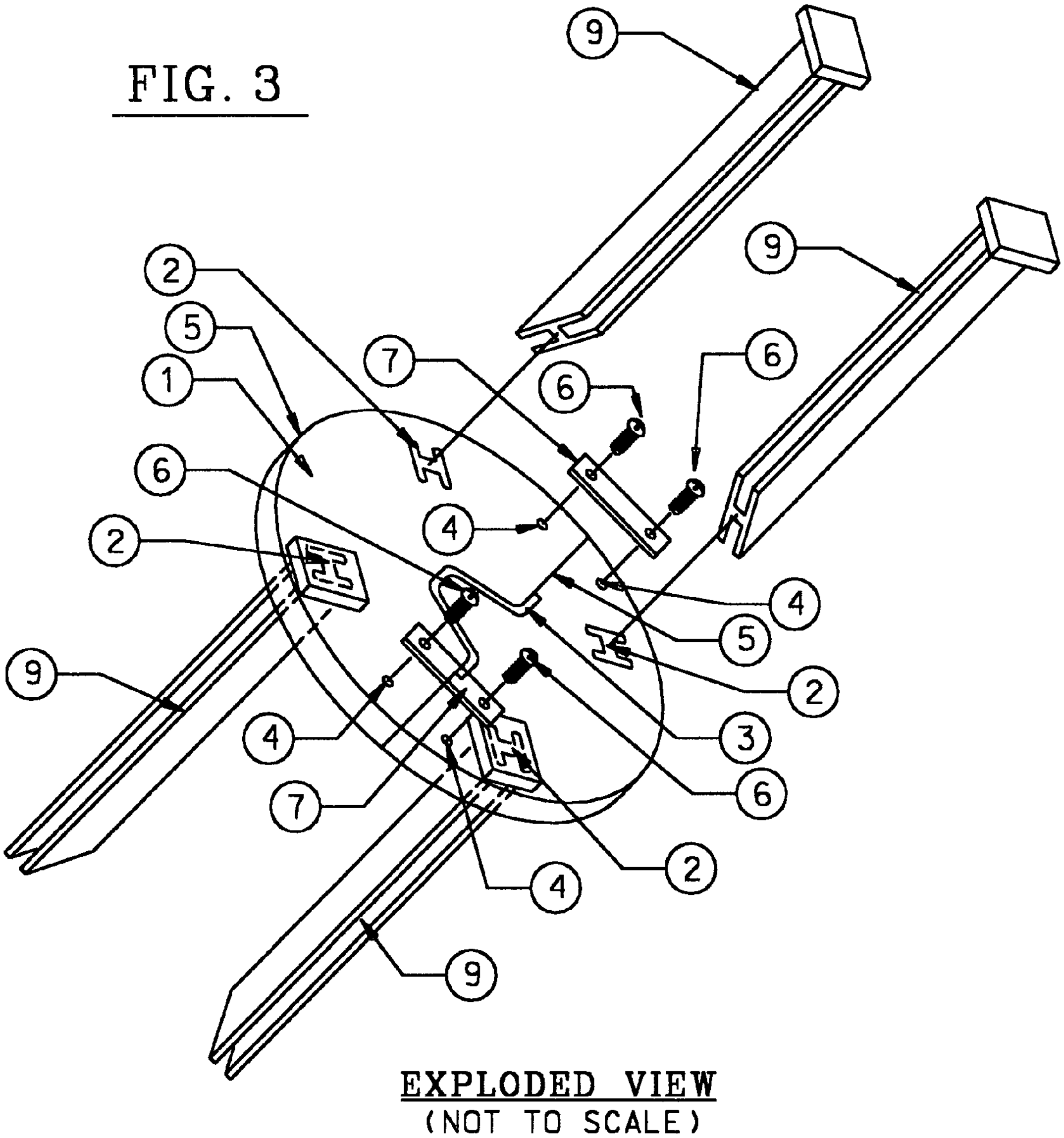
FIG. 3 shows the device in an exploded view in order to show how the parts of the device are assembled together. All parts shown are assigned a reference number.

1. Secure Post device.
2. Cut out for standard anchor stake.
2A. Cut out for other type of anchor stake such as metal cork screw.
3. Cut out for sign post—can vary depending on type of sign as shown in figures.
4. Machine screw hole used to attach the two halves of the device by use of a steel mending plate.
5. Cut line distinguishing each of the two halves of the device.
6. Stainless steel machine screw.
7. Steel mending plate.
8. Existing or proposed manufactured sign post.
9. Anchor stake.

DETAILED DESCRIPTION OF THE INVENTION

FIG. 1 shows a general type Secure Post device. The Secure Post device (1) is composed of two halves that enables the Secure Post to be placed around an existing post (8). The center opening of the Secure Post device (3) can be varied in production to accommodate the various shapes and styles of posts. The two halves are placed together along a line (5) and joined together using two stainless steel mending plates (7) and four stainless steel machine screws (6) which are screwed in to the four machine screw holes (4). The device can then be anchored into the ground by hammering the stakes (9) through the stake openings (2) and into the ground.

Although not shown in the figures, the Secure Post device could be manufactured integral to a new sign post. In this case, the Secure Post device would be a single piece unit either molded as part of the post or attached to the post prior to the post installation.

The Secure Post device works on the simple principal of dispersing the forces that are exerted onto the base of a sign or mailbox post from the effects of wind, snow and other forces over a larger area. Typically, a street sign or mailbox is supported by a single post. The surface area of the sign or mailbox is substantially greater than the area of the post. Forces exerted on the object being supported by the post are concentrated to the post and transferred down the post to the surface of the ground. In the case of wind forces on street signs, this creates a rocking and twisting motion of the post on the ground. Over time this motion will carve out an area at the ground and allow the sign to lean. The Secure Post device distributes the rocking and twisting motion over the area of the device and stakes thereby preventing the post from carving a void in the adjacent soil and the sign being able to lean. The size, thickness, shape and anchoring stakes of the Secure Post device can be varied to adapt the device to any type of post, soil condition and sign forces. A larger sign being supported by a post embedded in poorer soils would require a larger diameter device than a smaller sign in good soil.

The Secure post device can be easily installed with the use of a hammer, hand shovel and screwdriver. While testing in colder climates with freezing ground conditions has found the device to function best when placed approximately 4 inches below ground, the device can also be placed atop of the existing ground. The Secure Post device shall be installed by the following method: Prior to installing the device, the existing sign or other type post must be pushed back into an upright and plumb condition. Next, if the Secure Post device is to be installed below grade, the hand shovel should be used to excavate an area about 2 inches larger than the surface of the Secure Post device and approximately 4 inches deep. Next, whether at or below grade, the open area at the base caused by moving the sign back to a straight and vertical position should be filled with soil. The loose soil in the excavated area around the base of the sign post should be compacted around the base using the hammer and made level.

The Secure Post is now ready to be installed. The two halves are placed around the post and screwed together using the mending plates and machine screws. The device is then lowered into the excavated area. Anchoring stakes are then hammered through the Secure Post devise and into the ground until the stake head is touching the top of the device. It is recommended the stakes be hammered into the ground at slightly differing angles to assist in resisting the forces of frost heave. Finally, cover the entire Secure Post device with the previously excavated material and the job is complete. The entire task should be able to be completed by a single person crew in under ten minutes.

In conclusion, the Secure Post device provides a simple low cost, effective solution to retain a sign, mailbox or other type post in a straight and vertical position either after being restored from a leaning condition or as a means to prevent a sign from leaning in a new installation. The preferred use will be to restore a leaning sign as there is no simple current device available for this purpose except those that involve the removal and replacement of the post.

The invention claimed is:

1. A device that is installed around a base of a new or existing post to provide supplemental structural stability to such post, and consists of:

two sections derived from the equal division of a single flat plate of a geometric shaped material that contains:

a primary orthogonal penetration located at the center of the single flat plate and of a geometric shape that identically matches a cross-sectional configuration of the post that the device is to be installed around;

secondary orthogonal penetrations through each section, set equidistant from one another that are of a size and shape to accept any of a variety of anchoring stakes extending therethrough; and a third set of penetrations that are of a size and shape to allow the sections to be joined together by any of a number of suitable structures to form the single flat plate about the base of the correspondingly configured post;

the suitable structures comprising one of a set of steel mending plates and screws, plastic pull ties or other materials required to join the two sections together to form the single flat plate of geometric shaped material from which the two sections were originally divided;

the anchoring stakes having a designated length and cross-sectional shape to fit securely through a cross sectional area of the secondary penetrations and of a quantity equal to the number of secondary penetrations; and wherein each anchoring stake includes a lower terminal end defined by a pointed projection and an upper terminal end which includes an anchor head that is larger in cross sectional area than the cross-sectional area of the secondary penetration.

2. The device of claim 1 providing additional stability to a post previously embedded into the ground when installed around a base of the existing post without requiring removal of the existing post.

3. The device of claim 2 creating an additional horizontal anchored surface area located perpendicular to a vertical post so that the forces of energy from wind, human interaction, snow plowing, freeze/thaw and others and the moments thereby created and exerted upon the single fixed point of the cross-sectional area of sign at the ground are dispersed by spreading the forces of energy and moments created over the larger combined cross-sectional area of the post and the device engaged thereabout.

* * * * *